United States Patent [19]

Chaudoin et al.

[11] Patent Number: 4,989,364

[45] Date of Patent: Feb. 5, 1991

[54] FUMIGATION METHOD

[75] Inventors: James J. Chaudoin, Norco; Michael R. Linford, Villa Park, both of Calif.

[73] Assignee: Isothermics Incorporated, Long Beach, Calif.

[21] Appl. No.: 515,725

[22] Filed: Apr. 27, 1990

[51] Int. Cl.$^5$ .............................................. A01M 13/00
[52] U.S. Cl. ...................................... 43/125; 43/132.1
[58] Field of Search ................ 43/124, 125, 126, 132.1

[56] References Cited

U.S. PATENT DOCUMENTS

| | | | |
|---|---|---|---|
| 1,304,747 | 5/1919 | Dingle | 43/126 |
| 1,322,149 | 11/1919 | Swain | 43/126 |
| 1,743,660 | 1/1930 | Edwards | 23/125 |
| 4,800,672 | 1/1989 | Jackson | 43/125 |
| 4,833,818 | 5/1989 | Berta | 43/124 |

Primary Examiner—Richard K. Seidel
Assistant Examiner—Chuck Y. Mah
Attorney, Agent, or Firm—Grant L. Hubbard

[57] ABSTRACT

An improved method of fumigating a building structure which is enclosed in a substantially gas-impermeable barrier into which insect-eradicating case is introduced, by inflating one or more expandable bladders in substantially open spaces in the building before introducing the insect-eradicating gas is disclosed.

3 Claims, No Drawings

FUMIGATION METHOD

BACKGROUND OF THE INVENTION

This invention relates to the eradication and control of insects in building structures by fumigation with insecticidal gases. One of the common methods of treating building structures is to enclose the building structure in a vapor barrier, either built in to the structure or added to the structure, or a combination of the above, and fill the barrier with a gas which kills the insects in the building structure. The technique is particularly applicable to small- and medium-sized buildings which are reasonably susceptible to being "tented," i.e., having a tent built over and about the building structure for containing the insecticidal gas. Similar techniques may be used in treating animal shelters as well as dwelling houses and business buildings designed for human occupancy.

A number of gases are known to be suitable for fumigation of building structures to eradicate insect infestations in the structures. Methyl bromide, for example, is a widely used fumigant. The method, conventionally, requires that the building structure be enclosed in a substantially gas-impermeable barrier. Depending upon the building structure, this may comprise tenting the entire building above the ground surface by covering it with a polymer or fabric-reinforced polymer tent, which may be one piece or may be made up of several pieces which are clipped or bound together to form a substantially gas-impermeable seam. It is common practice, for example, to provide seams between large tarpaulins of polymer membrane or fabric-reinforced polymer membrane by rolling the edges of the tarpaulins together and securing the rolled portions by clips spaced at sufficient intervals to maintain the rolled seam. For smaller structures, a single-piece tent may suffice, but for larger structures, a multiple-piece tent is usually required. Once the structure is tented and the tent is secured to the ground or the surrounding supporting surface by clips, weights, tape or other means, an insecticidal gas is introduced into the tent. This may be done by a hose which enters into the tent by, for example, pumping the insecticidal gas from a service truck outside the building. The gas may also be introduced by a "bomb" or "charge" of insecticide inside the building which may be set off by a timer or by an external signal, such as a radio frequency-controlled signal, for example. Depending upon the relative density of the gas which serves as the insecticide as compared with air, vents may be provided at the top of the tent or near the bottom to permit the air to escape as the insecticidal gas fills the tent. Once the tent is filled with insecticidal gas, the building is maintained in its tented condition for a suitable period of time, usually several hours, to permit the gas to permeate into all of the spaces in the building, including small pours in the wood structures, borings of insects into the wood, etc., so that the insecticide reaches all of the insects, larvae, and eggs of the insects. Depending upon the insecticide, the insects may be totally destroyed, in all stages of their life cycle, or it may be necessary to repeat the fumigation periodically as new life cycles occur.

Methyl bromide is given as a typical example of the kind of insecticidal gas which may be used in connection with this invention and which is used in the conventional fumigation practice. Other insecticides may be used, such as 2-methyl-4-oxo-3-(2 bropynyl)cyclopent-2-enyl chrysanthemate, formaldehyde (usually for animal shelters and not for human shelters), which may be generated from paraformaldehyde flakes or formalgen, or any other insecticide, since the nature of the insecticide is not critical insofar as the present invention is concerned. The foregoing is all prior art, and constitutes the prior art as to which the present invention is an improvement.

It is immediately apparent from a careful consideration of this well-known practice, and is well understood and recognized in the art, that there are two major disadvantages of this technique. First of all is the ecological impact of introducing insecticidal gas into the atmosphere. Regardless of the recovery techniques utilized, if any, it is inevitable that substantial amounts of the insecticidal gas will escape into the atmosphere. In most operations, no effort is made to recover the insecticide from within the tent, and the entire volume of insecticide is simply permitted to escape into the atmosphere. While most of these insecticides are not highly toxic to humans, all of them inherently have a certain level of toxicity. The addition of these toxic gases to the atmosphere, particularly in areas where the atmosphere tends to become somewhat stagnant, such as in the Los Angeles basin of Southern California, in London, and in certain other areas, the addition of toxic gases to an already pollutant-laden atmosphere becomes a very serious consideration. While some of these insecticidal gases hydrolyze and become less toxic, or otherwise react with components of the atmosphere and become less toxic, generally speaking these pollutants remain in their toxic state in the atmosphere for long periods of time, the only dissipating force being the simple dilution in the atmosphere. Over a long period of time, of course, most organic compounds will be broken down, but this may take months or even years, and some such compounds are extremely stable over very long periods of time. It would, therefore, be a very great step forward in the art to reduce the amount of insecticidal gas pollution resulting from building structure fumigation.

The other major consideration is the cost of the insecticidal gas. It will be readily understood that it is necessary to completely fill the building structure with the insecticidal gas, even though much of the structure itself is simply open space or substantially open space. If it were possible to obtain the same concentration of insecticidal gas in and around the buildings structures per se, without supplying sufficient insecticidal gas to fill the entire building structure, it would be a very great step forward in the economics of fumigation.

It is to the foregoing problem that the present invention is addressed.

The present invention is an improvement in the fumigation of a building structure which is normally enclosed in a substantially gas-impermeable barrier by the introduction of an insect-eradicating gas, the improvement being inflating an expandable bladder in substantially open spaces in the building before the introduction of the insect eradicating gas.

As an overall process, the invention may be described as the steps of placing one or more expandable bladders inside the building in one or more substantially open spaces which are defined by the building structure, or by the contents of the building, then inflating the bladder with inert gas, e.g. air, to cause the bladder substantially to fill and to occupy the substantially open space at the building, thereafter enclosing the building structure and carrying out the fumigation in the usual manner, while maintaining the bladder in its inflated condition to occupy the substantially open space of the building. After the fumigation is completed, the insect-eradicating gas is removed from the building, the building is opened, and the bladder is deflated and removed.

Depending upon the size, construction and usage of a particular building, it is possible, using the present invention, to reduce the effective volume of the building by from 50% to 80% and, thereby, reduce the insecticidal gas by approximately the same percentage.

DESCRIPTION OF THE PREFERRED EMBODIMENT

In the following and in the preceding discussion, exemplary embodiments of the invention are disclosed, for the purpose of teaching those skilled in the art how to use the invention, and not as limitations on the invention.

One of the early steps, and typically the first step, of carrying out the present method is to place at least one expandable bladder inside the building in at least one substantially open space. The open space may be defined by the building structure and/or by the contents of the building structure. The expandable bladder may be a large, inflatable balloon which is inflated against the resiliency of the material of which the balloon is formed. A large rubber balloon, for example, may be used as the expandable bladder, compressed air being forced into the inside of the bladder to expand the bladder against the resiliency of the rubber walls of the balloon to fill the space in the building structure. The bladder need not, however, be made of a resilient material. It may be made of a polymeric membrane, or a fabric-reinforced polymeric membrane which is essentially non-resilient, i.e. does not stretch. In such case, the bladder would typically be pleated, or folded, or may be formed in a particular configuration, such as a cube or a parallelepiped, or in a shape designed to fit into a particularly shaped space, e.g. a long bladder having a generally triangular cross-section, when inflated, to fit into spaces in the roof structure. Generally speaking, however, the bladder need not be in any particular configuration so long as, when it is inflated, it will occupy the substantially open space in that portion of the building.

In a conventional residence, for example, it would be quite feasible to move the furniture, if any, which was in the center area of the room, against the walls and to fill virtually all of the space in the room with an inflated bladder which would conform in large measure to the objects in the room, pieces of furniture. It would be necessary, in such instance, to remove particularly fragile objects, etc., to prevent their being broken by the bladder as it is inflated, but it would not be necessary in most instances to remove the contents of the building structure.

Since a bladder will be required for each open space, the operator will typically have a range of bladders having different sizes. For example, a bladder may be provided to fill a very small room and be in the configuration of a cube, parallelepiped, or even a sphere, having an inflated volume of, for example, 1,000 cubic feet. For very large rooms and for large industrial buildings which have large service or storage bays, a single large bladder or a plurality of bladders could be used. Reference has been made and will be made to the term "substantially open space." This term means, as used in this specification and in the claims, the space in a room, or a portion of a building, which is free or essentially free of solid structure and is not surrounded by or closed by a solid structure in such a way as would prevent an expandable bladder to enter therein. The substantially open space would, of course, comprise the central volume of the room from the floor or the top of the furniture to the ceiling. It would also include those corners and other portions of the room into which the bladder could expand. Quite obviously, there will be some space into which the bladder cannot expand, e.g., behind furniture, under tables and chairs, etc. Thus, the term "substantially open space" is simply a shorthand term to mean that space within a building or within a room into which a bladder can expand without breaking or damaging the building structure or its contents, when the bladder is inflated.

The bladder is then inflated with an inert gas, typically, the inert gas would simply be air introduced from a compressor. There may be unique circumstances which may suggest the use of another gas, but generally speaking, air as an inflating gas would be quite adequate.

Typically, after the bladder or bladders are in place in the building, the building structure is enclosed in a substantially gas-impermeable barrier. Quite obviously, the bladder could be inflated after the building structure is enclosed, but this would seem not to have any particular advantages. Generally speaking, the order in which the steps are carried out is not important as long as the bladder is inflated at the time the insect-eradicating gas is introduced into the barrier.

The substantially gas-impermeable barrier may be a tent which encompasses all or a substantial portion of the building, e.g., all of that portion of the building above the ground surface. It may comprise portions of the building as well. For example, if the building has an outer wall, or a wall in its totality, which is gas impermeable, a gas impermeable barrier may be formed simply by taping or otherwise affixing a polymer or fabric-reinforced polymer or other vapor barrier over the windows, doors, and other openings. Any combination of structures which will prevent the insect-eradicating gas from escaping at a rate which would defeat the fumigation process or unduly pollute the air outside the building could satisfactorily be used in this invention.

Once the bladders are inflated and the building structure is enclosed in the substantially gas-impermeable barrier, the insect-eradicating gas is introduced into the barrier, either directly into the building, into the building through the openings in the building, or otherwise. If, for example, methyl bromide is used as the insect-eradicating gas, the gas may be pumped into the building from an external service truck or released by a remote control mechanism from a bomb, charge, or gas cylinder inside the building. The manner in which the insect-eradicating gas is introduced is, of course, of no importance insofar as the overall concept of the invention is concerned, as long as the insect-eradicating gas substantially fills the gas-impermeable barrier except for that portion occupied by the bladders.

The term "insect-eradicating gas" is used in its general sense to include any material which is toxic to insects, insect larvae or insect eggs, and which exists as a gas, can be volatilized, or which can be carried as a vapor by another material.

Once the insect-eradicating gas has filled the building, except for the bladders, and has been maintained in contact with the building for a time sufficient to permit the insect-eradicating gas to permeate the building structures and to kill the insects, then the gas is removed from the building. This gas removal may be simply venting the substantially gas-impermeable barrier to the air and letting the natural air circulation carry the gas away. It could also involve recovering the gas by, for example, pumping it through an adsorbent, an absorbent, or a chilled or cryogenic tank, for example, which would condense the gas into a liquid. It is known, for example, that most organic compounds will be adsorbed on activated charcoal from which it may be desorbed by heating the charcoal bed. Whatever the method of removing the insect-eradicating gas from the building, once it has been removed to the point where it is safe to open the barrier, the gas-impermeable barrier is opened, the bladders are deflated, and then, typically, the bladders are removed from the open space or spaces in the building.

When one considers that the substantially open space in most buildings is at least 50%, and often as high as 70% or 80% or higher, the cost savings and the ecological pollution savings of the invention will be readily recognized. The initial cost of obtaining the bladders can be amortized over a long period of time, since the bladders can be reused many times. From a pure economic point of view, the cost savings will be very, very significant.

Perhaps the most important contribution of the invention, however, is the very substantial reduction in the introduction of toxic gases into the already polluted atmosphere in which most people in the industrialized world live.

It will be apparent form the foregoing that the invention may be practiced in virtually any kind of building structure, industrial, residential, animal housing, or otherwise.

It can be practiced, for example, in grain elevators by simply filling up the unfilled portion of the elevator with one or more bladders. It will also be apparent that the specific kind of materials or structures of the materials involved are not important insofar as the invention is concerned only to the extent that they perform the desired functions.

INDUSTRIAL APPLICATION

This invention finds application in the fumigation and insect control industries.

What is claimed is:

1. A method of fumigating a building structure comprising the steps of:
    (a) placing at least one expandable bladder inside the building in at least one substantially open space defined by the building structure or the contents thereof;
    (b) inflating the bladder with inert gas to cause the bladder substantially to fill and occupy said substantially open space;
    (c) enclosing the building structure in a substantially gas-impermeable barrier;
    (d) introducing insect-eradicating gas into the building while the bladder occupies said open space therein;
    (e) removing the insect-eradicating gas from the building;
    (f) opening the gas-impermeable barrier; and
    (g) deflating and removing the bladder from the open space.

2. A method of fumigating a building structure comprising the steps of:
    (a) placing expandable bladders inside the building in substantially open spaces defined by the building structure or the contents thereof;
    (b) inflating the bladders with inert gas to cause the bladder substantially to fill and occupy said substantially open spaces;
    (c) enclosing the building structure in a substantially gas-impermeable barrier;
    (d) introducing insect-eradicating gas into the building while the bladders occupy said open spaces therein;
    (e) removing the insect-eradicating gas from the building;
    (f) opening the gas-impermeable barrier; and
    (g) deflating and removing the bladders from the open spaces.

3. In the fumigation of a building structure enclosed in a substantially gas-impermeable barrier by the introduction of an insect-eradicating gas into the enclosed building, the improvement comprising the step of: inflating an expandable bladder in substantially open spaces in the building before introduction of the insect-eradicating gas.

* * * * *